(12) United States Patent
Aso

(10) Patent No.: US 8,173,312 B2
(45) Date of Patent: May 8, 2012

(54) FUEL CELL SYSTEM WITH ELECTRIC STORAGE DEVICE AND VOLTAGE CONVERTER

(75) Inventor: Shinji Aso, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 890 days.

(21) Appl. No.: 11/992,954

(22) PCT Filed: Oct. 23, 2006

(86) PCT No.: PCT/JP2006/321580
§ 371 (c)(1),
(2), (4) Date: Apr. 2, 2008

(87) PCT Pub. No.: WO2007/055117
PCT Pub. Date: May 18, 2007

(65) Prior Publication Data
US 2009/0269622 A1    Oct. 29, 2009

(30) Foreign Application Priority Data
Nov. 9, 2005 (JP) .................................. 2005-324447

(51) Int. Cl.
H01M 16/00 (2006.01)
H01M 8/04 (2006.01)
(52) U.S. Cl. ......... 429/428; 429/429; 429/430; 307/9.1; 307/10.1
(58) Field of Classification Search .......... 429/428–430; 307/9.1, 10.1
See application file for complete search history.

(56) References Cited

U.S. PATENT DOCUMENTS

| 6,369,461 B1 | 4/2002 | Jungreis et al. |
| 2004/0217732 A1 | 11/2004 | Zhu et al. |
| 2005/0184594 A1 | 8/2005 | Fredette |
| 2006/0222909 A1 | 10/2006 | Aoyagi et al. |

FOREIGN PATENT DOCUMENTS

| JP | 01-318543 A | 12/1998 |
| JP | 2002-118981 A | 4/2002 |
| JP | 2003-111400 A | 4/2003 |
| JP | 2003-114660 A | 4/2003 |
| JP | 2004-357467 A | 12/2004 |
| JP | 2005-229699 A | 8/2005 |
| WO | WO 2005/004269 A2 | 1/2005 |

Primary Examiner — Patrick Ryan
Assistant Examiner — Ladan Mohaddes
(74) Attorney, Agent, or Firm — Kenyon & Kenyon LLP

(57) ABSTRACT

The present invention seeks, when a temporary abnormality occurs in a voltage converter, a recovery of the voltage converter, and minimizes the inadequacy of the drive power. In a fuel cell system comprising an electric storage device disposed with a voltage converter, in the case where an abnormality occurs in the voltage converter, the voltage converter is stopped once, an attempt is made to recover the voltage converter to a normal state after the voltage converter is stopped, and drive power is generated in at least a fuel cell until the voltage converter recovers to the normal state. It is preferred that an upper limit of the power which can be generated when the voltage converter recovers to the normal state be set to a value lower than an upper limit of power obtained prior to the occurrence of the abnormality. Further, it is preferred that the limit be canceled step by step when recovering the voltage converter to a normal state.

6 Claims, 4 Drawing Sheets

FUEL CELL SYSTEM WITH ELECTRIC STORAGE DEVICE AND VOLTAGE CONVERTER

This is a 371 national phase application of PCT/JP2006/321580 filed 23 Oct. 2006, which claims priority of Japanese Patent Application No. 2005-324447 filed 9 Nov. 2005, the contents of which are incorporated herein by reference.

BACKGROUND OF THE INVENTION

1. Field of the Invention

The present invention relates to a fuel cell system and a control method thereof. More specifically, the present invention relates to the improvement of a control method in the case where any abnormality occurs in a voltage converter in a fuel cell system.

2. Description of Related Art

There is a fuel cell system in which a battery and a fuel cell are connected in parallel with each other via a voltage converter, and an auxiliary apparatus of the fuel cell is disposed so as to make a connection between the voltage converter and the battery, whereby the fuel cell can be driven by driving the auxiliary apparatus even when an abnormality occurs in the voltage converter (see Japanese Patent Application Laid-Open No. 2002-118981, for example).

However, in the case where the voltage converter functions abnormally, although the abnormality is temporary and thus a recovery to a normal state is likely, the drive power becomes insufficient, if there is no choice but to rely on the drive of the fuel cell.

An object of the present invention, therefore, is to provide a fuel cell system, which seeks a recovery of a voltage converter when a temporary abnormality occurs in the voltage converter, and minimizes the inadequacy of the drive power, and to provide a control method of the fuel cell system.

SUMMARY OF THE INVENTION

In order to solve the above problem, the inventors of the present invention have conducted various studies. In a current movable body (a fuel cell hybrid vehicle, for example), the vehicle is stopped immediately when an abnormality (fail) occurs in a voltage converter. However, most of the times, such a fail is actually temporary and thus it is usually the case that a recovery is likely, but a movable body (a vehicle or the like) which is installed with, for example, a fuel cell, is usually stopped. In view of such a point, sometimes it is advantageous to cause the movable body to continue traveling in order to recover to a normal state. The inventors of the present invention have conducted further studies based on this point and have discovered a technology which can resolve such problems.

The present invention is based on such a discovery, and the invention is a fuel cell system in which an electric storage device and a fuel cell are connected in parallel with each other via a voltage converter, the fuel cell system comprising: means for stopping the voltage converter when an abnormality occurs in the voltage converter; means for making an attempt to recover the voltage converter to a normal state after the voltage converter is stopped; and means for generating drive power in at least the fuel cell until the voltage converter recovers to the normal state.

In a control method of a fuel cell system according to the present invention, in a fuel cell system in which an electric storage device and a fuel cell are connected in parallel with each other via a voltage converter, in the case where an abnormality occurs in the voltage converter, the voltage converter is stopped, an attempt is made to recover the voltage converter to a normal state after the voltage converter is stopped, and drive power is generated in at least the fuel cell until the voltage converter recovers to the normal state.

In the fuel cell system and the control device thereof according to the present invention, in the case where an abnormality occurs in the voltage converter (a high voltage converter, for example), the entire system is not stopped immediately, but determination is made as to whether a recovery to a normal state is possible or not, whereby the possibility of the recovery is sought. Specifically, first a determination is made as to whether the voltage converter recovers from a state in which the voltage converter is temporarily stopped (shut down), and the voltage converter is caused to recover to the normal state if possible. Moreover, during a period in which the target voltage converter is temporarily shut down until recovering to the normal state, drive power is continued to be generated in the fuel cell, whereby the drive power of the system is prevented from being insufficient.

It is preferred that until at least the voltage converter starts to recover to the normal state, a limit is set on the value of power capable of passing through the voltage converter. In this case, even if the voltage converter is supposedly brought to a state where it can recover to the normal state, the power capable of passing through the voltage converter (or convertible power) remains limited.

Further, it is preferred that an upper limit of power which can be generated when the voltage converter recovers to the normal state is set to a value lower than an upper limit of power generated before the abnormality occurs. In this case, it is possible to prevent a fluctuation of an output obtained when the voltage converter recovers from a temporary abnormal state to the normal state.

Furthermore, it is preferred that the limit is canceled step by step when the voltage converter is caused to recover to the normal state. For example, in the case where this fuel cell system is mounted in a movable body such as a fuel cell hybrid vehicle, the occurrence of vibration or shock can be prevented by canceling the limit step by step.

It is preferred that when the voltage converter is in the abnormal state, an output of the fuel cell is obtained by performing an operation which is different from the operation performed when the voltage converter is in the normal state, in response to a request of the output of the fuel cell. In this case, the operation which is different from the one during the normal state includes changing of, for example, a stoichiometry.

The fuel system according to the present invention comprises a control device for carrying out the control method described above.

According to the present invention, even when a temporary abnormality occurs in the voltage converter, the inadequacy of the drive power can be minimized since a recovery after the occurrence of the temporary abnormality is sought.

DETAILED DESCRIPTION OF PREFERRED EMBODIMENTS

Figure 1:
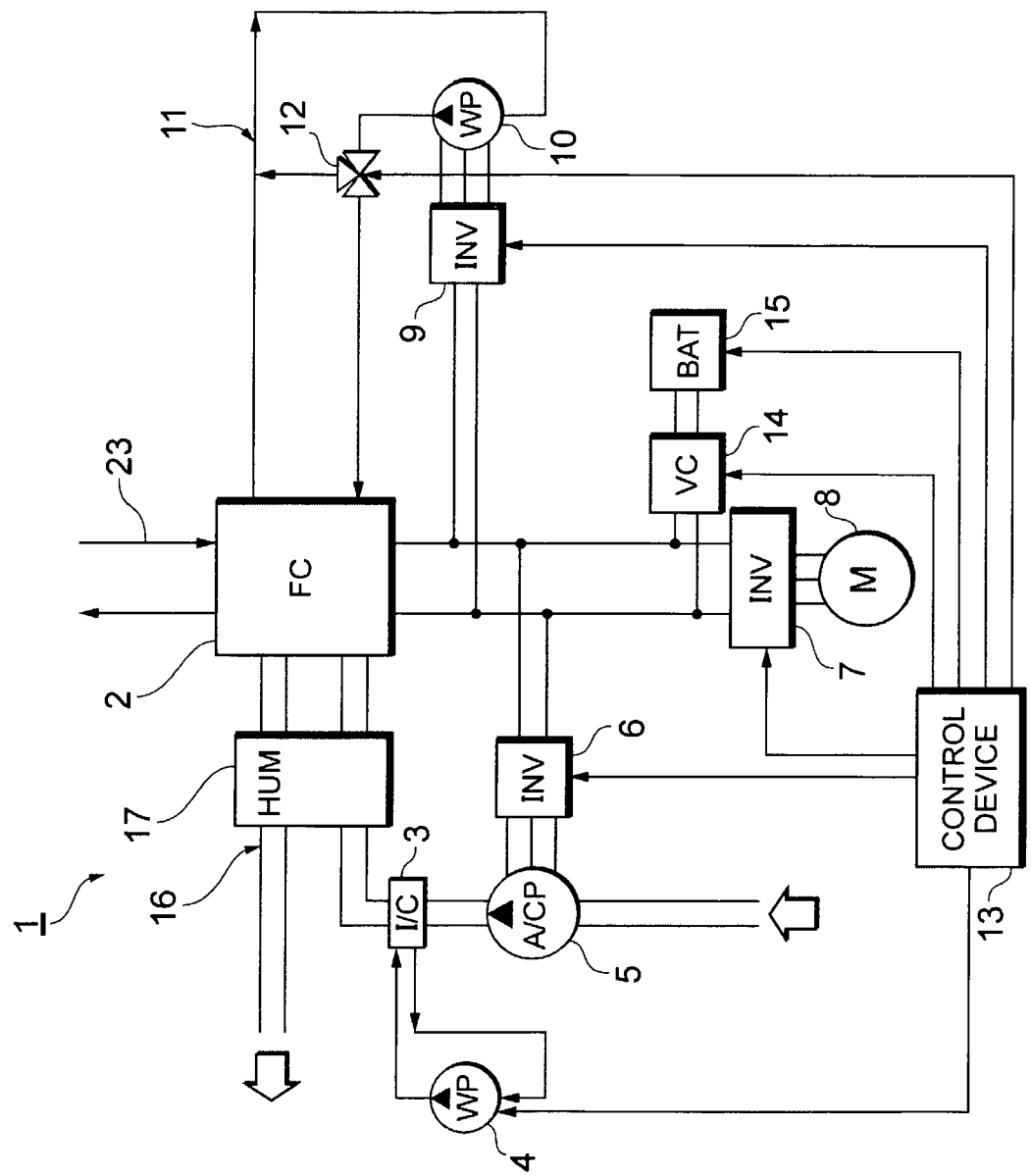
FIG. 1 shows a schematic configuration of a fuel cell system according to an embodiment of the present invention.

Hereinafter, a configuration of the present invention is described in detail on the basis of an example of the embodiments shown in the drawings.

Figure 2:
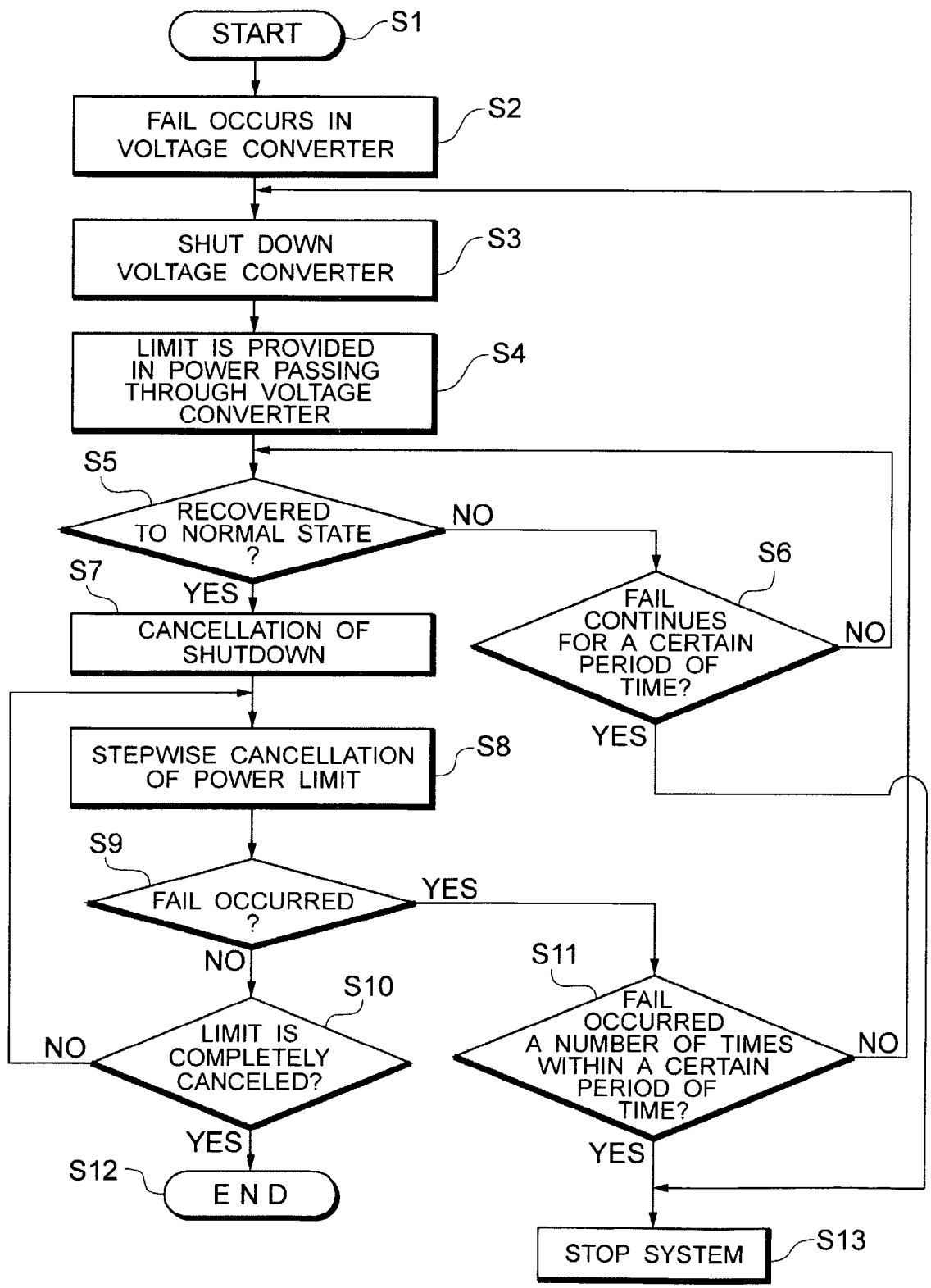
FIG. 2 is a flowchart showing the content of control in the embodiment of the present invention.
Figure 3:
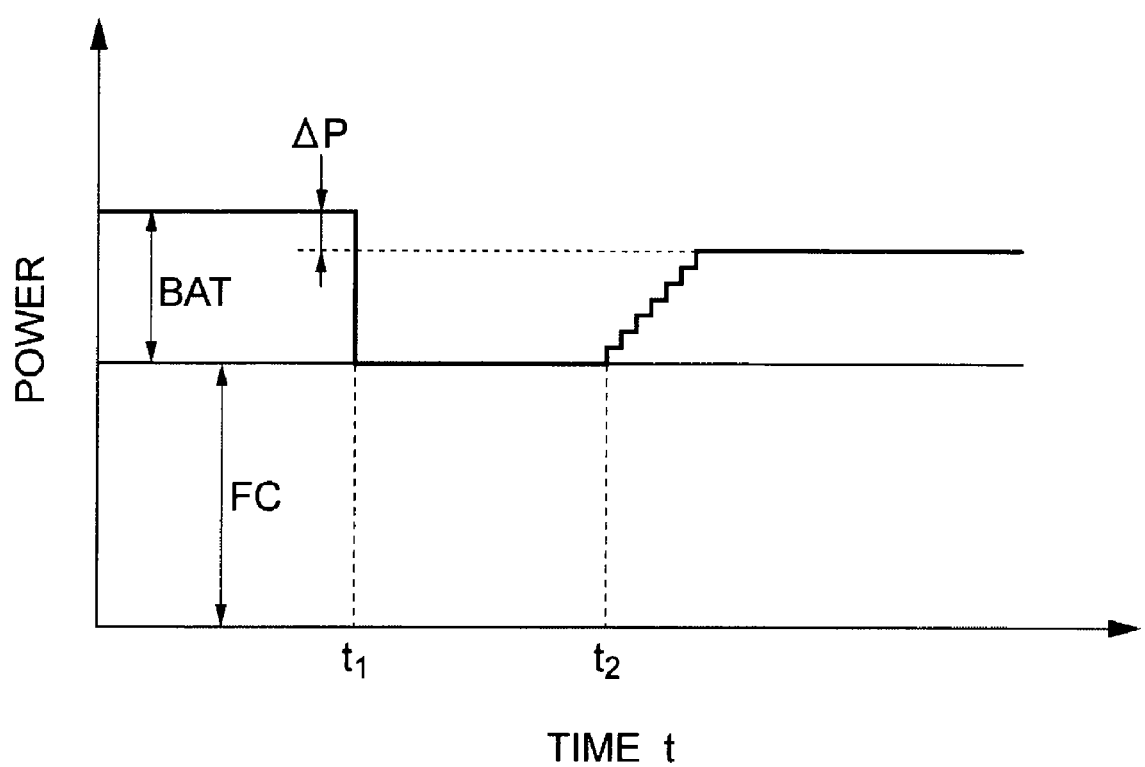
FIG. 3 is a graph showing an example of a change of power in the fuel cell system.

FIG. 1 through FIG. 3 show an embodiment of the fuel cell system according to the present invention. The fuel cell system 1 according to the present invention has therein an electric storage device 15 and a fuel cell 2 connected in parallel with each other via a voltage converter 14, and comprises means for stopping the voltage converter 14 when an abnormality occurs in the voltage converter 14, means for making an attempt to recover the voltage converter 14 to a normal state after the voltage converter 14 is stopped, and means for generating drive power in at least the fuel cell 2 until the voltage converter 14 recovers to the normal state. Hereinafter, a summary of the fuel cell system 1 is described first, and thereafter the content of the control method of the fuel cell system 1 at the time of the occurrence of an abnormality is described (see FIG. 1 through FIG. 3).

FIG. 1 shows a schematic configuration of the fuel cell system 1 according to the present embodiment. The fuel cell system 1 illustrated in the present embodiment can be used as, for example, an on-board power generating system for a fuel cell hybrid vehicle (FCHV). However, application of the fuel cell system 1 is not limited, thus it is a matter of course that the fuel cell system 1 can be used as a power generating system or the like mounted in various movable bodies (ships, airplanes, and the like, for example), robots, and other self-propelled machines. A fuel cell stack, which is not shown, has a stack structure which is formed by stacking a plurality of single cells in series, and constituted with, for example, a polymer electrolyte fuel cell or the like.

An oxidation gas supply system for the fuel cell 2 comprises an air compressor 5, an inter cooler 3, and an inter-cooler cooling water pump 4 (see FIG. 1). The air compressor 5 compresses air taken in from the outside via an air filter which is not shown. The inter cooler 3 cools the air which is compressed and heated. The inter-cooler cooling water pump 4 circulates cooling water for cooling the inter cooler 3. The air compressed by the air compressor 5 is cooled by the inter cooler 3 as described above, thereafter passes through a humidifier 17, and is then supplied to the cathode (air electrode) of the fuel cell 2. Oxygen off-gas, which is obtained after being used in a cell reaction of the fuel cell 2, flows in a cathode off-gas flow passage 16 and is emitted to the outside of the system. This oxygen off-gas is in a highly humidified state since it contains moisture generated from the cell reaction in the fuel cell 2. Therefore, the humidifier 17 is used to exchange moisture between the oxidation gas in a low humidified state before being supplied and the oxygen off-gas in a highly humidified state, which flows in the cathode off-gas flow passage 16, to appropriately humidify the oxidation gas supplied to the fuel cell 2.

A hydrogen gas supply system for the fuel cell 2 is constituted as a system for supplying hydrogen as a fuel to the fuel cell 2. For example, in the case of the present embodiment, a plurality of (four, for example) high-pressure hydrogen tanks (not shown) are arranged in parallel as a hydrogen storage source, and hydrogen is led to the anode (fuel electrode) of the fuel cell 2 through a hydrogen gas supply passage 23.

A port for the cooling water (LLC) of the fuel cell 2 is provided with a cooling water pipe 11 for circulating the cooling water. This cooling water pipe 11 is provided with a water pump 10 for sending the cooling water and a flow passage switching valve 12 for regulating the amount of cooling water to be supplied.

A part of the DC power generated in the fuel cell 2 is depressurized by the voltage converter (high voltage converter) 14 and charged in a secondary battery (referred to as "high voltage battery" and indicated by a numeral 15, hereinafter) which functions as a high voltage electric storage device. A motor inverter (traction inverter) 7 converts the DC power supplied from the fuel cell 2 into AC power and supplies the AC power to a traction motor 8. Further, a water pump inverter 9 converts the DC power supplied from the fuel cell 2 into AC power and supplies the AC power to the water pump 10. Furthermore, an air compressor driving inverter 6 converts the DC power supplied from the fuel cell 2 into AC power and supplies the AC power to the air compressor 5.

A control device 13 is a device for, if installed in, for example, a fuel cell hybrid vehicle, obtaining system demand power (sum of the vehicle running power and the auxiliary apparatus power) on the basis of an acceleration aperture, vehicle speed and the like, and controlling the system so that the fuel cell 2 corresponds with the target power. Specifically, the control device 13 adjusts the rotation speed of a motor (not shown) driving the air compressor 5 and the amount of supplied oxidation gas by controlling the air compressor driving inverter 6. Moreover, the control device 13 adjusts the temperature of the compressed air by controlling the inter-cooler cooling water pump 4. The control device 13 further controls the motor inverter 7 to adjust the rotation speed of the traction motor 8 and controls the water pump inverter 9 to adjust the water pump 10. In addition, the control device 13 controls the voltage converter 14 to adjust operation points (output voltage, output current) of the fuel cell 2, and performs adjustment so that the output power of the fuel cell 2 corresponds with the target power.

Further, the control device 13 in the present embodiment also functions as the means for stopping the voltage converter 14 when an abnormality occurs in the voltage converter 14, the means for making an attempt to recover the voltage converter 14 to a normal state after the voltage converter 14 is stopped, and the means for generating drive power in at least the fuel cell 2 until the voltage converter 14 recovers to the normal state. These functions are realized by a program stored in, for example, an arithmetic processing unit inside the control device 13.

Next, embodiments of the present invention are described hereinafter. In the present embodiment, in the case where an abnormality or a surprising event occurs in the voltage converter 14 of the fuel cell system 1, a predetermined process is carried out, and a normal recovery is sought so as to cause the voltage converter 14 to recover if possible. It should be noted in the present specification that an abnormality or a surprising event occurring in the voltage converter 14 is also called "fail". "Fail" described here means that the voltage converter temporary or constantly falls into at least a state in which a desired operation cannot be carried out.

Hereinafter, specific examples are described (see FIG. 2 and FIG. 3). Here, the high voltage converter (simply referred to as "voltage converter" and indicated by a numeral 14, hereinafter) is shown as an example of the voltage converter 14, and a case in which a fail occurs in the voltage converter 14 is described.

First, a control is started for recovering the voltage converter to a normal state when a fail occurs (step S1). This step is preferred in terms of that, in the case of, for example, a movable body such as a fuel cell hybrid vehicle or the like, an IG (ignition) device of the fuel cell system 1 is activated and at the same time a normal recovery control is started so that a normal recovery operation can be attempted when a fail occurs at any time.

Here, when a fail occurs in the voltage converter 14 (step S2), the voltage converter 14 is stopped once and then shut down (step S3). For example, in FIG. 3, if a fail occurs in the voltage converter 14 at time t1, the voltage converter 14 is brought into a temporarily stopped state. However, in this case the fuel cell 2 itself is not stopped, and the operation of the fuel cell system 1 is continued by means of the power generated by the fuel cell 2 (in the present specification, this state is referred to as "drifting operation performed by the fuel cell 2" or simply "drifting operation" for convenience). When considering the power which can be supplied in the fuel cell system 1, a state in which a sum of the power generated by the fuel cell 2 and the power which can be supplied from the high voltage battery (secondary cell) 15 can be supplied until the time t1 is changed to a state in which the voltage converter 14 is temporarily shut down due to the occurrence of a fail (time t1). Accordingly, a state is obtained in which only the power of the fuel cell 2 can be supplied (see FIG. 3). In the case of the fuel cell hybrid vehicle of the present embodiment, the traction motor 8 is continuously driven by this drifting operation performed by the fuel cell 2.

Further, during this drifting operation, it is preferred that the operation be performed in a state in which air stoichiometry is increased. By increasing the amount of supplied fuel gas to be more than the amount at the time of the occurrence of the fail (hydrogen lean gas→hydrogen rich gas), the cell voltage in the fuel cell 2 can be prevented from decreasing. The air stoichiometry (also referred to as "air stoichiometry ratio") means a surplus oxygen rate, which indicates the ratio between the amount of supplied oxygen with respect to the proper amount of oxygen required to be reacted.

Furthermore, in the present embodiment, the power which passes through the voltage converter 14 is limited (step S4). In this case, the voltage converter 14 is in the temporarily stopped state, and a control is added so that the power which can pass through the voltage converter 14 is limited beforehand. Therefore, even if the stopped state of the voltage converter 14 is canceled, the power which can pass therethrough remains limited. Such limitation of the passing power (step S4) can be carried out by, for example, using the control device 13 to limit the computation. It should be noted that in the present embodiment the passing power is limited immediately after the voltage converter 14 is shut down (step S3, step S4), but the timing of providing the limit is not limited to this manner, thus it is only necessary to provide a limit at least until the shutdown is canceled.

Further explanation of the abovementioned power limit is provided below. Specifically, usually the voltage or current between the fuel cell 2 and the traction motor 8 (or the motor inverter 7) is actively controlled by the control device 13, but when a fail occurs as in the present embodiment, there is a case where the value of the voltage or current is passively determined according to the balance between the power generating side and the power consuming side. From the perspective of preventing a fluctuation of the power under such circumstances, it is preferred that a command value be set to the passively determined value or a value proximate thereto, when recovering the voltage converter 14. As a voltage command at the time of recovery (time t2), it is most preferable, in terms of the system, to set the voltage command value for the drifting operation directly as a threshold.

It is preferred that a power upper limit after the recovery of the voltage converter 14 be set to a value which is lower than the value prior to the occurrence of a fail by multiplying the value prior to the occurrence of a fail by a certain rate. Accordingly, it is possible to prevent a power fluctuation which occurs when the voltage converter 14 recovers from the temporary failed state. For example, in the present embodiment, the power upper limit after the recovery is lowered by ΔP, compared to the power upper limit obtained prior to the occurrence of the fail (for example, approximately 20% of the BAT power before the occurrence of the fail) (see FIG. 3).

Next, the abovementioned drifting operation is carried out, and thereafter it is determined whether the voltage converter 14 is recovered to the normal state or not (step S5). In the case where the voltage converter 14 recovers to the normal state, the step proceeds to a step S7 (see FIG. 2). On the other hand, if the voltage converter 14 does not recover to the normal state (NO in the step S5), it is determined whether the fail, which has occurred in the voltage converter 14, continues for a certain period of time (step S6). If the fail does not continue (in other words, if the certain period of time has not yet elapsed since the fail occurred), the step returns to the step S5, and a determination is made again as to whether the voltage converter 14 has recovered to the normal state or not. Meanwhile, if the fail continues for the certain period of time, it is determined that this fail is not temporary, and the fuel cell system 1 is stopped (step S13). It should be noted in the present embodiment that the fuel cell system 1 is stopped in the step S13, but this step is merely an example, thus the drifting operation performed by the fuel cell 2 may be continued.

In the case where the voltage converter 14 recovers to the normal state, the shutdown is canceled in the step S7. Here, the voltage converter 14 can be driven by canceling the stopped state thereof (step S7). Further, in the case where the air stoichiometry is changed in accordance with the drifting operation, the voltage converter 14 is returned to the original state.

Furthermore, subsequently to the cancellation of the shutdown (step S7), power limit for the voltage converter 14 is canceled (step S8). In this case, it is preferred that the cancellation of the power limit be performed step by step as shown in FIG. 2. If the limited power recovers instantly, consequently the drive power of the traction motor 8 increases, and vibration or shock occurs in the fuel cell hybrid vehicle depending on circumstances, impairing riding comfort and driveability of an occupant. However, by performing the cancellation step by step as described in the present embodiment, such situations can be avoided, and sudden changes in operations, which are caused due to the occurrence of the fail, can also be avoided. It should be noted that FIG. 2 shows a case in which the power limit is canceled step by step after the time t2, but this process is merely an example, thus the cancellation may be performed non-stepwise so as to show, for example, a straight or curved upward slope. The point is that the riding comfort and the like are not necessarily impaired if the sudden changes can be prevented by recovering the power not instantly but gradually.

Further, in the present embodiment, while canceling the shutdown as described above, it is determined whether a fail does not occur again (step S9). In the case where a fail occurs again, the step proceeds to a step S11 (see FIG. 2). If a fail does not occur, it is determined whether the power limit is canceled completely (step S10), and if the cancellation is not completed, the step returns to the step S8 to further cancel the limit.

On the other hand, if it is determined in the step S10 that the power limit is canceled completely (YES in step S10), the series of processes for the occurrence of the fail are ended (step S12). Specifically, as a result of stepwise cancellation of the power limit after the time t2, when the power reaches the upper limit (the upper limit here is set to a value which is lower than the value obtained prior to the occurrence of a fail by ΔP) the limit is canceled completely, and it can be determined that the voltage converter 14 has recovered to the normal state.

According to the control method of the present embodiment described above, for example, in the case where a temporary abnormality occurs in the voltage converter such as the voltage converter 14, the possibility of the normal recovery is sought, and the voltage converter can be recovered if possible. According to this manner, when a temporary abnormality occurs, the drive power as the fuel cell system 1 can be prevented from being insufficient as much as possible. Moreover, the system is not stopped (or the fuel cell hybrid vehicle is not stopped) only because an abnormality (fail) occurs in the voltage converter, thus the operation of the voltage converter can be continued in accordance with circumstances. Further, the system is stopped when the abnormality is not temporary (or drifting operation is carried out by means of the fuel cell 2), thus this embodiment is suitable as a so-called fail safe technology in terms of that inadequacy of the drive power can be prevented while securing the safety and reliability, and that the drive efficiency can be improved.

It should be noted that the abovementioned embodiment is an example of the preferred embodiment of the present invention, but the present invention is not limited to this embodiment and thus can be modified in various ways without departing from the spirit of the present invention. For example, a regeneration prohibit command may be added to the control method of the present embodiment. Specifically, if a control of prohibiting or reducing power regeneration in the fuel cell system 1 is carried out at the timing of the occurrence of a fail and the timing for starting the recovery control (time t1), the drive power can be prevented from being insufficient, while the voltage converter is stopped temporarily. The specific example of such a manner is as follows (see FIG. 4).

First, control is started for recovering the voltage converter 14 to the normal state when a fail occurs (step S21). Here, when a fail occurs in the voltage converter 14 (step S22), the voltage converter 14 is stopped once and then shut down (step S23). For example, in FIG. 3, if a fail occurs in the voltage converter 14 at the time t1, the voltage converter 14 is brought into a temporarily stopped state. However, in this case, the fuel cell 2 itself is not stopped, and the operation of the fuel cell system 1 is continued by means of the power generated by the fuel cell 2. Here, when considering the power which can be supplied in the fuel cell system 1, a state in which a sum of the power generated by the fuel cell 2 and the power which can be supplied from the high voltage battery (secondary cell) 15 can be supplied until the time t1 is changed to a state in which the voltage converter 14 is temporarily shut down due to the occurrence of a fail (time t1). Accordingly, a state is obtained in which only the power of the fuel cell 2 can be supplied (see FIG. 3).

Furthermore, the power which passes through the voltage converter 14 is limited (step S24). In this case, the voltage converter 14 is in the temporarily stopped state, and a control is added so that the power which can pass through the voltage converter 14 is limited beforehand. It should be noted here that the passing power is limited immediately after the voltage converter 14 is shut down (step S23, step S24), but the timing of providing the limit is not limited to this manner, thus it is only necessary to provide a limit at least until the shutdown is canceled.

Figure 4:
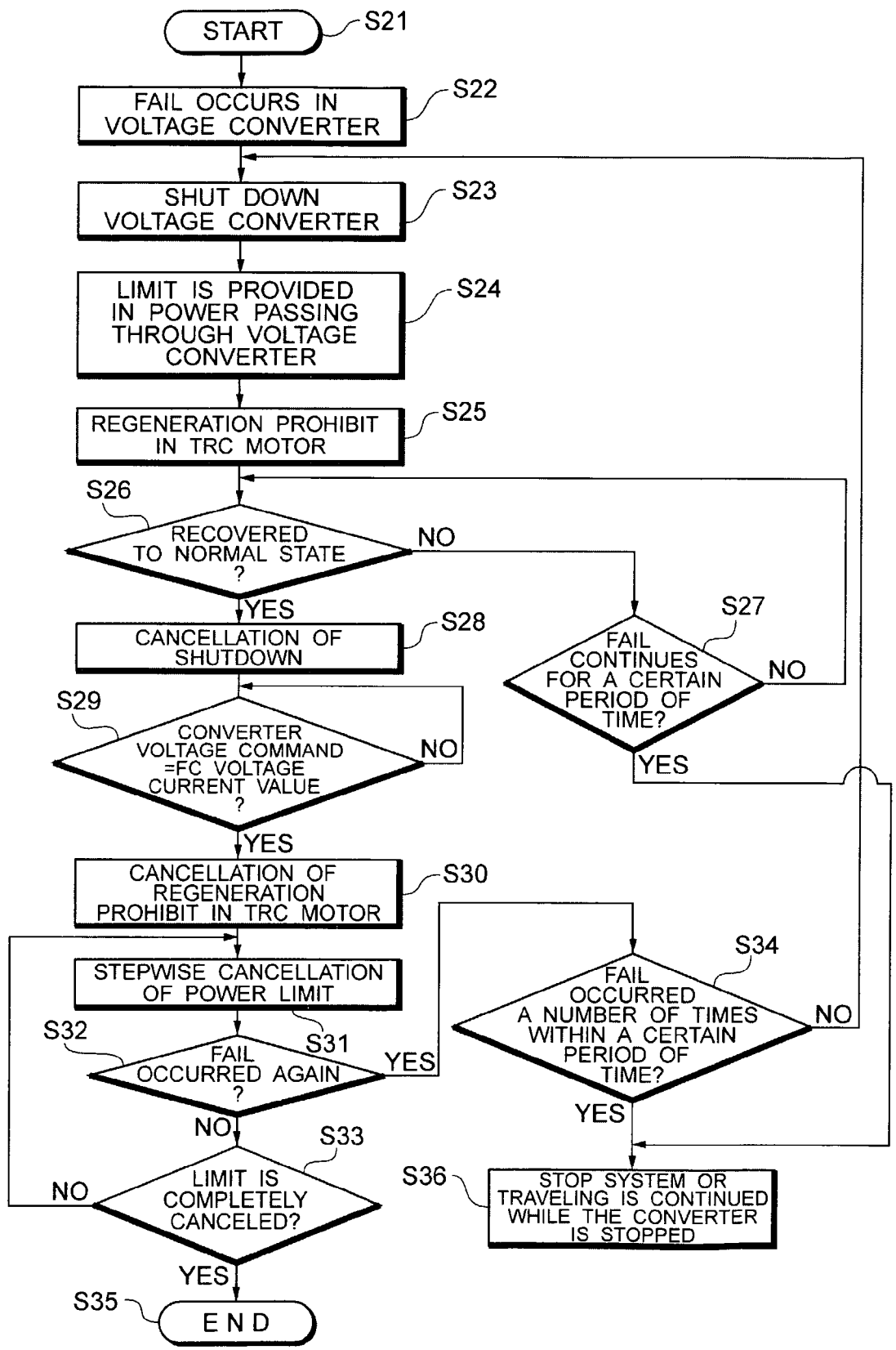
FIG. 4 is a flowchart showing the content of control in other embodiment of the present invention.

Moreover, in the present embodiment, a regenerative operation of the traction motor (TRC motor) 8 is prohibited (step S25). It should be noted that FIG. 4 shows a flowchart in which the step S25 is carried out subsequently to the step S24, but actually the prohibition of the regenerative operation of the traction motor 8 can be carried out simultaneously with limitation of the passing power (step S24).

Next, it is determined whether the voltage converter 14 is recovered to the normal state or not (step S26). In the case where the voltage converter 14 recovers to the normal state, the step proceeds to a step S28. On the other hand, if the voltage converter 14 does not recover to the normal state (NO in the step S26), it is determined whether the fail, which has occurred in the voltage converter 14, continues for a certain period of time (step S27). If the fail does not continue (in other words, if the certain period of time has not yet elapsed since the fail occurred), the step returns to the step S26, and a determination is made again as to whether the voltage converter 14 has recovered to the normal state or not. Meanwhile, if the fail continues for the certain period of time, it is determined that this fail is not temporary, and the fuel cell system 1 is stopped or traveling is continued while the voltage converter 14 is stopped (step S36).

In the case where the voltage converter 14 recovers to the normal state, the shutdown is canceled in the step S28. Here, the voltage converter 14 can be driven by canceling the stopped state thereof (step S28).

Furthermore, in the present embodiment, it is determined whether the voltage value (voltage current value) of the fuel cell 2 at that moment is equal to the value of the voltage command for the voltage converter 14 (step S29). If these values are equal to each other, the step proceeds to a step S30. In response to the result in which the voltage value (voltage current value) is equal to the voltage command value, regeneration prohibit for the traction motor 8 is cancelled in the step S30 (see FIG. 4). Further, the power limit for the voltage converter 14 is cancelled step by step (step S31).

Moreover, while canceling the shutdown as described above, it is determined whether a fail does not occur again (step S32). In the case where a fail occurs again, the step proceeds to a step S34 (see FIG. 4). If a fail does not occur, it is determined whether the power limit is canceled completely (step S33), and if the cancellation is not completed, the step returns to the step S31 to further cancel the limit.

On the other hand, if it is determined in the step S33 that the power limit is canceled completely, the series of processes for the occurrence of the fail are ended (step S35). Specifically, as a result of stepwise cancellation of the power limit after the time t2, when the power reaches the upper limit (the upper limit here is set to a value which is lower than the value obtained prior to the occurrence of a fail by ΔP) the limit is canceled completely, and it can be determined that the voltage converter 14 has recovered to the normal state.

According to the present invention, even when a temporary abnormality occurs in the voltage converter (voltage converter 14, for example), the inadequacy of the drive power can be minimized since a recovery after the occurrence of the temporary abnormality is sought.

Therefore, the present invention can be widely used in a fuel cell system and control method thereof, for example, as an on-board power generating system for a fuel cell hybrid vehicle or the like.

The invention claimed is:

1. A fuel cell system in which an electric storage device and a fuel cell are connected in parallel with each other via a DC/DC converter, the fuel cell system comprising:

a device configured to stop the DC/DC converter when an abnormality occurs in the DC/DC converter;

a device configured to make an attempt to recover the DC/DC converter to a normal state after the DC/DC converter is stopped;

a device configured to generate drive power in at least the fuel cell until the DC/DC converter recovers to the normal state;

a device configured to set a limit on a value of power capable of passing through the DC/DC converter, at the latest, by the time the DC/DC converter starts to recover to the normal state; and a device configured to set an upper limit of power which can be generated in the fuel cell system when the DC/DC converter recovers to the normal state to a value lower than an upper limit of power generated before the abnormality occurs.

2. A control method of a fuel cell system in which an electric storage device and a fuel cell are connected in parallel with each other via a DC/DC converter, wherein in the case where an abnormality occurs in the DC/DC converter, the DC/DC converter is stopped, an attempt is made to recover the DC/DC converter to a normal state after the DC/DC converter is stopped, and drive power is generated in at least the fuel cell until the DC/DC converter recovers to the normal state, and comprising the steps of:

setting a limit on a value of power capable of passing through the DC/DC converter, at the latest, by the time the DC/DC converter starts to recover to the normal state, and setting an upper limit of power which can be generated in the fuel cell system when the DC/DC converter recovers to the normal state to a value lower than an upper limit of power generated before the abnormality occurs.

3. The control method of a fuel cell system as defined in claim 2, wherein the limit is canceled step by step when the DC/DC converter is caused to recover to the normal state.

4. The control method of a fuel cell system as defined in claim 2, wherein when the DC/DC converter is in the abnormal state, an output of the fuel cell is obtained by performing an operation which is different from the operation performed when the DC/DC converter is in the normal state.

5. A fuel cell system in which an electric storage device and a fuel cell are connected in parallel with each other via a DC/DC converter, the fuel cell system comprising a control device for carrying out the control method described in claim 2.

6. The control method of a fuel cell system as defined in claim 4, wherein the operation, which is different from the operation performed when the DC/DC converter is in the normal state, is performed in a state in which air stoichiometry is increased.

* * * * *